UNITED STATES PATENT OFFICE.

JOSEPH BEASLEY, OF HANDSWORTH, COUNTY OF STAFFORD, ENGLAND, ASSIGNOR TO JOHN HOWARD MITCHELL, OF PHILADELPHIA, PA.

PROCESS OF PURIFYING IRON.

SPECIFICATION forming part of Letters Patent No. 302,088, dated July 15, 1884.

Application filed November 1, 1883. (No specimens.) Patented in England June 15, 1882, No. 2,820; in Belgium September 30, 1882, No. 59,164, and in France October 13, 1882, No. 151,555.

*To all whom it may concern:*

Be it known that I, JOSEPH BEASLEY, a subject of Her Majesty the Queen of Great Britain, residing at Handsworth, in the county of Stafford, England, have invented certain new and useful Improvements in Processes of Purifying Iron; and I do hereby declare that the following is a full, clear, and exact description of the invention, which will enable others skilled in the art to which it appertains to make and use the same.

The invention relates to the manufacture of a superior class of malleable iron or steel from impure pig-iron.

The invention consists of treating the impure metal while in a molten condition, either in a puddling or other furnace or converter lined with the materials and in the manner hereinafter indicated and set forth.

The fettling or lining for the furnace or converter I form of calcined tap-cinder from puddling-furnaces and the slags from the hammer or squeezer, commonly called "hammer-slags." These materials, after they have been ground to a condition similar to fine sand or powder and thoroughly mixed, are saturated with from five to ten per cent. of hydrochloric acid diluted with about its equal weight of water, and with these combined materials are thoroughly mixed from twenty to twenty-five per cent. of finely-ground or slaked lime (or from forty to fifty per cent. of finely-ground limestone may be employed) and five to six per cent. of common salt, all the proportions being somewhat varied, according to the nature or analysis of the iron to be treated. The mixture thus obtained is applied as a fettling or lining for the bottom or sides, or both, of the furnaces or converters, and may be dried before being used or applied in a moist condition.

An alternative method of preparing the lining is to melt the mixed fettling or lining materials at a high temperature in a puddling or other suitable furnace with the cinder which is drawn or tapped from puddling-furnaces, or with the slags from the hammers or squeezers or scale from the rolls or from other sources, and run the molten mixture into molds of the desired shape or directly into the furnace or converter, within which a suitable core has been previously formed.

By experiment I have found that a charge of 500 ℔s. (five hundred pounds) of pig-iron containing from 1½ (one and one-half) to 2 (two) per cent. of phosphorus may be advantageously treated in a furnace fettled or lined with 100 (one hundred) pounds of the before-mentioned cinder and slag saturated with 5 (five) pounds of the acid diluted with an equal quantity of water and 20 (twenty) to 25 (twenty-five) pounds of slaked or ground lime (or forty to fifty pounds of finely-ground limestone) and 5 (five) pounds of common salt. I do not confine myself to the exact quantities stated, but increase or diminish the quantities according to the nature of the iron to be operated upon as far as regards phosphorus, &c., the said fettling or lining materials, when well mixed, as above described, being distributed over the bottom and sides of the puddling-chamber over the ordinary fettling or lining.

When treating a low grade of iron containing an excessive amount of phosphorus—such as the iron made from forge-cinder, and commonly known as "cinder-pig"—in addition to the fettling or lining before described I apply, instead of the usual quantity of hammer-slag, about the same proportion or quantity of finely-ground puddlers' tap-cinder mixed with salt and saturated with the hydrochloric acid in the same proportions as hereinbefore described; or I add to the molten bath about 4 (four) pounds of common salt and 4 (four) pounds of cinder and slag saturated with the diluted hydrochloric acid and 7 (seven) pounds of slaked or finely-ground lime, all prepared as before described. These mixed materials are gradually added to the molten bath; but after successive charges of pig-iron have been worked and the slags have become surcharged with the lime or limestone a less quantity of the mixed material will be required, and the amount must be regulated accordingly, for an excessive amount of lime or limestone (especially the latter) will cause the iron produced to be what is generally termed "red short"—that is, brittle when hot. The fettling or lining, as above described, may be used for the floors of mill or other furnaces in place of the sand or silica which is generally used for that purpose. The mixed materials become melted with the slag or oxide produced from the iron, and are drawn off and used as a lining for puddling-furnaces.

The advantages I have found by the use of this improved lining, and in the case of low-grade pig-iron of the addition to the molten bath as well, being the elimination of the phosphorus or phosphoric acid, sulphur, and other impurities contained in the metal, which said impurities, by the action of and their combination with the hydrochloric acid, lime, and salt, will be eliminated, a saving in the cost of the fettling or lining, and a greater yield of puddled iron.

I am aware that it has before been proposed to use oxide of iron, chloride of sodium, lime, hydrochloric acid, and many chlorides and fluorides, magnesia, and alumina in mixtures of various compositions in the production of a non-silicious or basic lining for furnaces or other metallurgical vessels, and as an addition to the bath, (see British Patent No. 1,870 of 1879;) but I am not aware that prior to my invention a mixture of such iron-oxide-bearing materials as puddlers' tap-cinder and hammer-slag has ever been used as I have described in a ground condition mixed with salt and lime and hydrochloric acid, and applied as a lining or fettling and physic in the furnace or vessel in which the metallurgical process is being carried out.

What I therefore claim, and desire to secure by Letters Patent, is—

1. The process of manufacturing iron, which consists in treating molten iron in a furnace fettled or lined with a mixture of calcined tap-cinder, and hammer-slag, and salt saturated with diluted hydrochloric acid and lime or limestone, substantially as and for the purpose set forth.

2. The process of manufacturing iron, which consists in treating molten iron in a furnace fettled or lined with a mixture of calcined tap-cinder or hammer-slag and salt saturated with diluted hydrochloric acid and lime or limestone, and adding to the molten bath a physic composed of the same substances, substantially as and for the purpose set forth.

JOSEPH BEASLEY.

Witnesses:
J. BRAME,
J. M. DICKINSON.